(12) United States Patent
Eun

(10) Patent No.: US 8,467,511 B2
(45) Date of Patent: Jun. 18, 2013

(54) IMAGE FORMING APPARATUS AND METHOD OF CONTROLLING FAX THEREOF

(75) Inventor: Dae-gon Eun, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 626 days.

(21) Appl. No.: 12/659,529

(22) Filed: Mar. 11, 2010

(65) Prior Publication Data

US 2011/0043850 A1 Feb. 24, 2011

(30) Foreign Application Priority Data

Aug. 21, 2009 (KR) .................. 10-2009-0077827

(51) Int. Cl.
*H04M 11/00* (2006.01)
(52) U.S. Cl.
USPC .............. 379/100.01; 358/400; 718/105
(58) Field of Classification Search
USPC ................. 379/100.01; 358/449, 400
See application file for complete search history.

(56) References Cited

U.S. PATENT DOCUMENTS

| | | | |
|---|---|---|---|
| 2002/0080932 A1* | 6/2002 | Yoshida et al. | 379/93.01 |
| 2009/0064170 A1* | 3/2009 | Inoue | 718/105 |
| 2009/0303506 A1* | 12/2009 | Ikegawa et al. | 358/1.9 |

\* cited by examiner

*Primary Examiner* — Creighton Smith
(74) *Attorney, Agent, or Firm* — Staas & Halsey LLP

(57) ABSTRACT

A method of controlling a fax of an image forming apparatus which transmits/receives a fax using a plurality of telephone lines, includes detecting a size of a fax data to be transmitted; checking communication settings of the plurality of telephone lines according to the detection result; detecting whether the plurality of telephone lines are in use; and selecting one of the plurality of telephone lines to transmit the fax data using the communication settings of the telephone lines and whether the telephone lines are in use. An image forming apparatus with a multi-line faxing function capable of transmitting a fax by automatically selecting a telephone line with a favorable communication setting among a plurality of telephone lines, thereby reducing time involved in fax transmission and waste of communication charges.

20 Claims, 5 Drawing Sheets

IMAGE FORMING APPARATUS AND METHOD OF CONTROLLING FAX THEREOF

CROSS-REFERENCE TO RELATED APPLICATIONS

This application claims priority from Korean Patent Application No. 10-2009-0077827, filed on Aug. 21, 2009 in the Korean Intellectual Property Office, the disclosure of which is incorporated herein by reference.

BACKGROUND

1. Field

Apparatuses and methods consistent with the embodiments relate to an image forming apparatus and a method of controlling a fax thereof, and more particularly to an image forming apparatus having a multi-line faxing function and a method of controlling a fax thereof.

2. Description of the Related Art

An image forming apparatus forms an image printed on paper. The image forming apparatus may be provided as a printer, a photocopier, a fax machine, a multifunction device having two or more functions, etc.

If the image forming apparatus is realized by a multifunction device having a fax machine or a faxing function, the image forming apparatus may have a multi-line faxing function.

An image forming apparatus having a multi-line faxing function generally includes a plurality of telephone lines corresponding to a plurality of telephone numbers and a plurality of modems matching the plurality of telephone lines, respectively.

In the image forming apparatus with the multi-line faxing function, one telephone line is set to have a priority over another telephone line in fax transmission. Thus, the image forming apparatus conducts fax transmission using a telephone line with a priority when receiving a fax transmission instruction from a user.

However, there occurs a case that a telephone line with an inferior communication setting, e.g., a low communication speed, may be set to have a priority among a plurality of telephone lines.

In this case, since the image forming apparatus carries out fax transmission via a telephone line with a priority, which has a low communication speed, more time is involved in fax transmission than using a telephone line with a high communication speed, thereby causing waste of communication charges.

In particular, if a fax data has a high-capacity image data, such as a color photo, a difference in transmission time according to a communication speed increases to result in spending more unnecessary time and cost.

SUMMARY

Accordingly, it is an aspect to provide an image forming apparatus with a multi-line faxing function and a method of controlling a fax of the image forming apparatus, the image forming apparatus transmitting a fax by automatically selecting a telephone line with a favorable communication setting among a plurality of telephone lines if the fax data has a size of a reference value or more, thereby reducing time involved in fax transmission and waste of communication charges.

Another aspect is to provide an image forming apparatus which allows a user to conduct fax transmission using another telephone line or to select a standby mode if an automatically selected telephone line is in use, and a method of controlling a fax thereof.

The foregoing and/or other aspects can be achieved by providing a method of controlling a fax of an image forming apparatus which transmits/receives a fax using a plurality of telephone lines, the method including: detecting a size of a fax data to be transmitted; checking communication settings of the plurality of telephone lines according to the detection result; detecting whether the plurality of telephone lines are in use; and selecting one of the plurality of telephone lines to transmit the fax data using the communication settings of the telephone lines and whether the telephone lines are in use.

The method may further include displaying the selected telephone line.

The displayed telephone line may be changeable to another telephone line among the plurality of telephone lines by a user.

If the selected telephone line is in use, the telephone line may be changeable before use of the telephone line is completed.

In the detecting the size of the fax data, if the size of the fax data is less than a predetermined value, the fax data may be transmitted without checking the communication settings.

The predetermined value may be changeable by a user or an administrator.

The communication settings may include at least one of communication speeds of the respective telephone lines, whether an error correction mode is applied, and information about history of the communication speeds of the respective telephone lines.

The fax data may include at least one of an image data previously stored in the image forming apparatus, an image data scanned for fax transmission, and an image data received from an external device connectable to the image forming apparatus.

Another aspect can be achieved by providing a method of controlling a fax of an image forming apparatus which includes a plurality of telephone lines, the method including: selecting an auto line select mode in the image forming apparatus; loading an image data to be faxed; detecting communication settings of the plurality of telephone lines to transmit the image data to be faxed; and transmitting the image data to be faxed by selecting one of the plurality of telephone lines according to the detected communication settings.

Still another aspect can be achieved by providing an image forming apparatus which transmits a copy to be faxed using a plurality of telephone lines, the image forming apparatus including: an image reading part reading out the copy to be faxed and generating a fax data; a storage part storing the fax data for fax transmission and communication settings of the respective telephone lines; a display displaying an auto line select mode to be touchable for transmission of the fax data; a user operating part receiving a instruction of a user via touching the display or an input button; a faxing part transmitting the fax data and including a first faxing part corresponding to a first telephone line and a second faxing part corresponding to a second telephone line; and a controller controlling the fax part to transmit the fax data by selecting one of the first faking part and the second faxing part using the communication settings according to the auto line select mode.

The controller may control the faxing part to transmit the fax data by selecting one of the first telephone line and the second telephone line using whether the first telephone line and the second telephone line are in use.

The display may display the selected telephone line.

The display may include a first display provided in the image forming apparatus or a second display provided in a host device connected to the image forming apparatus.

The displayed telephone line is changeable to another telephone line among the plurality of telephone lines by a user.

If the selected telephone line is in use, the telephone line may be changeable before the telephone line is completed in use.

The communication settings may include at least one of communication speeds of the respective telephone lines, whether an error correction mode is applied, and information about history of the communication speeds of the respective telephone lines.

The apparatus may further include a communication part connectable with an external, wherein the fax data includes at least one of an image data previously stored in the storage part, an image data generated in the image reading part, and an image data received from an external device connectable via the communication part.

Additional aspects and/or advantages will be set forth in part in the description which follows and, in part, will be apparent from the description, or may be learned by practice of the invention.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION

Figure 1:
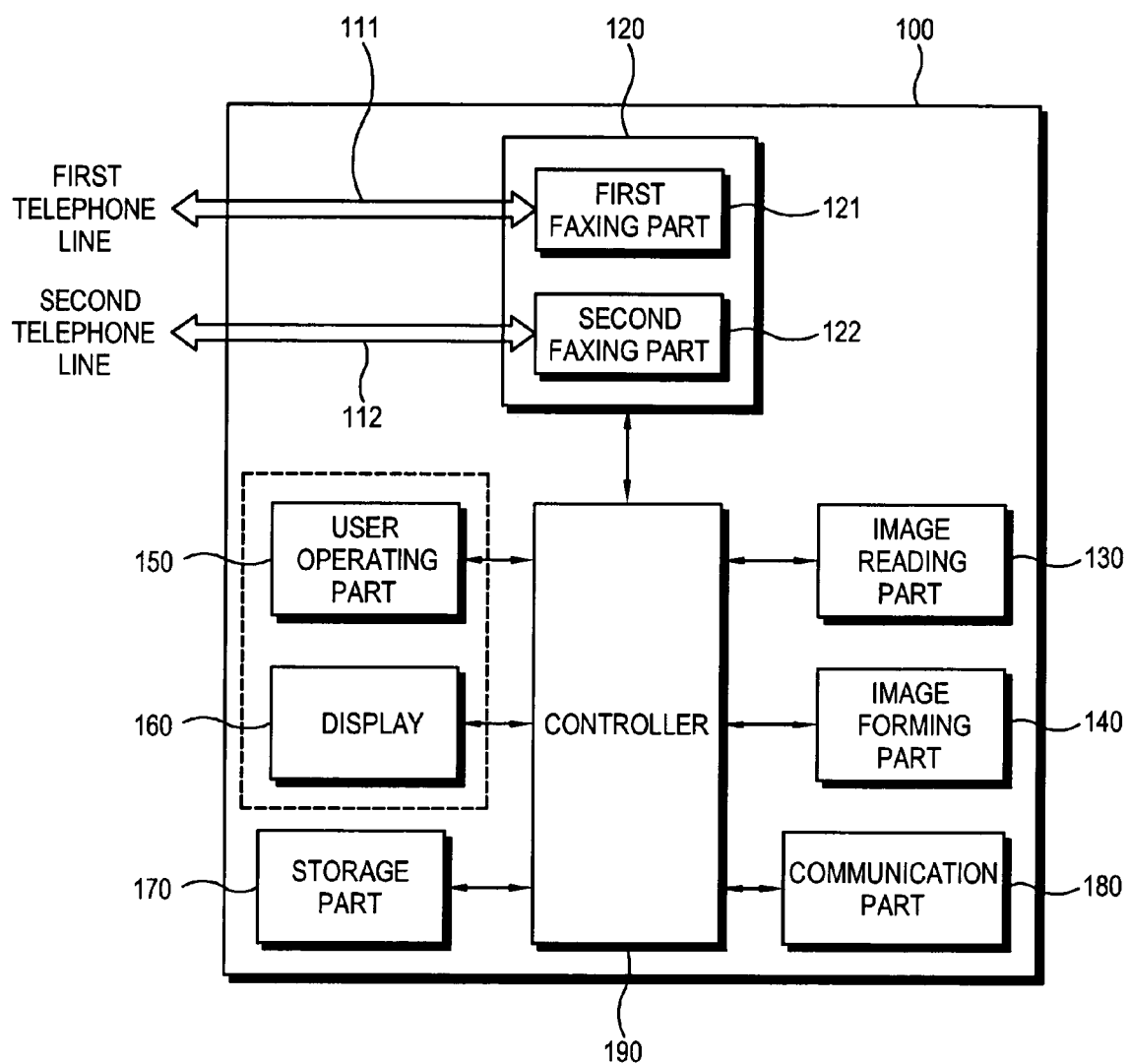
FIG. 1 is a block diagram of an image forming apparatus according to one exemplary embodiment.

Below, embodiments of the present invention will be described in detail with reference to accompanying drawings so as to be easily realized by a person having ordinary knowledge in the art. The present invention may be embodied in various forms without being limited to the embodiments set forth herein. Descriptions of well-known parts are omitted for clarity, and like reference numerals refer to like elements throughout.

FIG. 1 is a block diagram illustrating a configuration of an image forming apparatus 100 according to one exemplary embodiment. The image forming apparatus 100 may be provided as a fax machine or a multifunction device having a faxing function.

The image forming apparatus 100 has a multi-line fax sending/receiving function that is faxing through two or more telephone lines and includes a plurality of telephone lines corresponding to a plurality of telephone numbers, respectively, and a plurality of communication modules (e.g., modems) matching the telephone lines, respectively.

As shown in FIG. 1, the image forming apparatus 100 includes a first telephone line 111, a second telephone line 112, a faxing part 120, an image reading part 130, an image forming part 140, a user operating part 150, a display 160, a storage part 170, a communication part 180, and a controller 190. The faxing part 120 includes a first faxing part 121 and a second faxing part 122 which match the first telephone line 111 and the second telephone line 112, respectively.

The image forming apparatus 100 sends/receives a fax via at least one of the first telephone line 111 and the second telephone line 112. The first telephone line 111 and the second telephone line 112 correspond to different telephone numbers, respectively.

In the present embodiment, the second telephone line 112 may be set up to have a priority in fax transmission over the first telephone number 111. Here, the telephone number corresponding to the second telephone line 112 may be a key number among the plurality of telephone numbers.

The first faxing part 121 and the second faxing part 122 match the first telephone line 111 and the second telephone line 112, respectively, to serve to send/receive a fax. Accordingly, in the present embodiment, the second faxing part 122 may be set up to have a priority over the first faxing part 121 in fax transmission.

The first faxing part 121 and the second faxing part 122 convert a data read by the image reading part 130 into a signal to fax, or may be provided as a faxing communication module (e.g., a modem or fax card) receiving a fax signal from the external device.

The first faxing part 121 and the second faxing part 122 are set up to have predetermined communication speeds, respectively. Here, a communication speed may be set by a user or determined as a default when manufacturing the image forming apparatus 100.

A communication speed may be decided on the hardware configuration and settings for use of the first faxing part 121 and the second faxing part 122.

Here, if the first faxing part 121 and the second faxing part 122 are formed of the same modem, they may have the same communication speed in initial settings.

However, even with the first faxing part 121 and the second faxing part 122 set up to have the same initial communication speed, if the first telephone line 111 and the second telephone line 112 corresponding to the first faxing part 121 and the second faxing part 122, respectively, have different communication settings (e.g., noise on the lines or compatibility with a device of a recipient), a communication speed may be different by lines.

For example, a certain telephone line, i.e., the second telephone line 112, is deteriorated in line settings by settings for use or a hardware configuration, the communication speed of the second faxing part 122 corresponding to the second telephone line 112 is lowered for stable communication.

Here, in the case the second faxing part 122, which has been reduced in communication speed, is set to have a priority over the first faxing part 121, the image forming apparatus 100 tries to conduct faxing using the second telephone line 112, which has a reduced communication speed but a priority, thereby increasing time involved in sending a fax.

Also, higher-capacity data, such as photos or color data, involve more differences in faxing time according to communication speeds.

Required times by communication speeds per page in consideration of the kinds and sizes of fax data are given in the following Table 1.

TABLE 1

| Kind of fax data | | Text | Picture | Color data |
|---|---|---|---|---|
| Data size | | 50K bytes | 500K bytes | 1M byte |
| Communication time/ required time | 14,400 bps | 28.4 sec | 284.4 sec | 582.5 sec |
| | 33,600 bps | 12.2 sec | 121.9 sec | 249.7 sec |

As seen in Table 1, a data to be faxed varies in size per page depending on how complicated the data is or whether it is color or black-and-white.

Also, in the case a data is black-and-white, its size is changed depending on whether it is a text or photo.

That is, referring to Table 1, a text data generally has a size of tens of KBs per page, while a photo or color data has a size of hundreds of KB to 1 MB or more.

Accordingly, a photo-mode or color-mode data has an approximately ten times bigger size than a black-and-white data.

For example, with reference to Table 1, given the second faxing part 122 has a communication speed per unit time of 14,400 bps and the first faxing part 121 has a communication speed of 33,600 bps, it takes 582.5 seconds to fax one page of a 1 MB color data via the second telephone line 112 matching the second faxing part 122, whereas it takes 249.7 seconds to fax the same data via the first telephone line 111 matching the first faxing part 121. Thus, using the first telephone line 111 having a higher communication speed saves about 335.8 seconds in fax transmission.

Here, the more documents that are faxed, the size of data becomes bigger.

Further, as the size of a fax data gets bigger, a difference in faxing time between the first telephone line 111 and the second telephone line 112 according to communication speeds becomes even greater.

Accordingly, in the case a data to be faxed has a size of a predetermined reference value or more, the image forming apparatus 100 according to the present embodiment compares the communication settings of the first telephone line 111 and the second telephone line 112, i.e., the setup values of communication speeds and tries to conduct faxing via the first telephone line 111 having a favorable communication setting, i.e., a higher communication speed, even if the second telephone line 112 has a priority.

Here, the image forming apparatus 100 of the present embodiment has a reference value of 50 KB, which is the size of a general text data in fax transmission. The reference value may be set to a default value and changed by a user or administrator.

Meanwhile, when comparing communication settings, the image forming apparatus 100 may use other setup values such as whether an error correction mode is applied to the first faxing part 121 and the second faxing part 122, fax information (histories) by recipients stored in the storage part 170, mentioned later, etc.

An error correction mode is a compensation mode in which a faxing operation is retried when errors are detected in fax transmission. A faxing part in which an error correction mode is set up generally transmits more data, and thus it is considered to have a favorable communication setting.

Although the present embodiment with reference to FIG. 1 illustrates the image forming apparatus 100 which has two faxing parts including the first faxing part 121 and the second faxing part 122, the present embodiment is not limited thereto, and may also be applied to an image forming apparatus having three or more faxing parts. In this case, at least one telephone line has a priority in fax transmission over the other telephone lines.

The image reading part 130 reads out a copy to be faxed and generates a fax data. A copy to be faxed includes a document, a photo, a film, etc. The image reading part 130 may be provided as a scanning unit which scans a copy to be faxed into an image data. The image reading part 130 may include a photo converter such as charge-coupled device (CCD) or contact image sensor (CIS), an image processor which generates a image from a document by using a signal output from the photo converter, a scan motor to drive the photo converter, and a guide.

A fax data generated in the image reading part 130 is changed into a fax signal and transmitted by the first faxing part 121 or the second faxing part 122.

The image forming part 140 forms an image to be printed on at least a piece of paper on the basis of a print data. Here, printing includes printing a received fax data, printing a scanned data for copying, and printing a print data transmitted from the outside via a host device (not shown) having a server or stored in a hard disk drive (HDD) of the image forming apparatus 100 or an external device (Universal Serial Bus (USB) memory). The image forming part 140 may include a laser scanning unit (LSU) scans laser beams corresponding to a plurality of colors to form a latent image on a photosensitive body, a developing part which develops an image with a toner corresponding to the latent image formed on the photosensitive body, and a transferring part which transfers the toner developed on the electric-charged photosensitive body to a document (i.e. paper or printing medium).

The user operating part 150 receives instructions from a user. The user operating part 150 may include an input button (hereinafter, referred to as "hard key" or "key pad") provided on the image forming apparatus 100 or a graphic user interface (GUI, or also referred to as "UI") generated by the execution of a program, such as an application, and displayed on the display 160 so that a user inputs by touching or the like.

Also, user's instructions may be received from a host device connectable to the image forming apparatus 100 via the communication part 180, and a user includes an administrator.

A user inputs a fax transmission instruction using the user operating part 150, selects an auto line select mode for the first telephone line 111 and the second telephone line 112 in fax transmission, and decides whether to wait for fax transmission until a selected telephone line is available or to use another telephone line among a plurality of telephone lines in the case the selected telephone line is being used.

Figure 2:
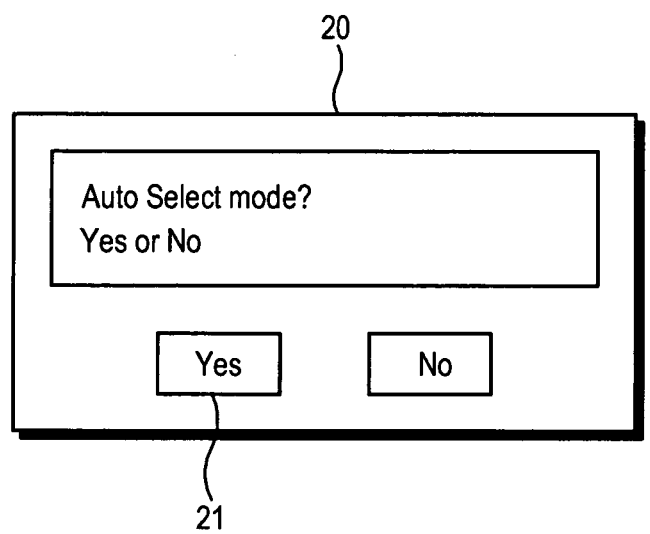
FIGS. 2 and 3 illustrate a UI screen for user's selection according to one exemplary embodiment.
Figure 3:
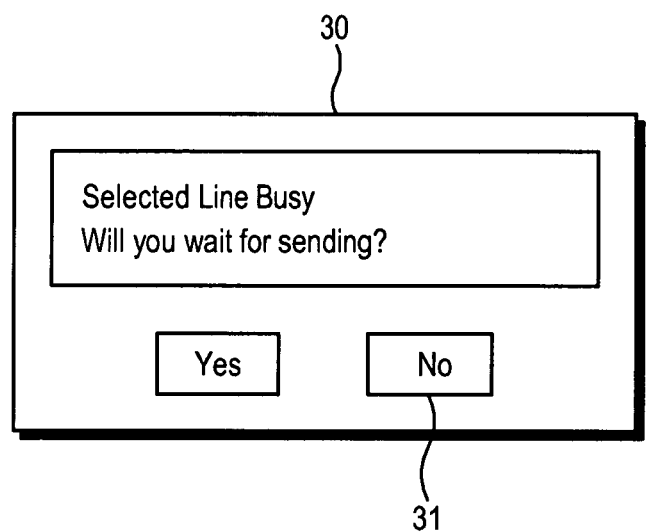

FIGS. 2 and 3 illustrate a UI screen for user's selection according to one exemplary embodiment of the present invention.

As shown in FIG. 2, the display 160 displays a mode selection screen 20 to set up an auto line select mode in the case a fax data has a size which is a predetermined value or more.

A user selects a select button 21 on the mode selection screen 20 of the display 160 (by touching) to set up an auto line select mode.

Setting up an auto line select mode may be carried out when initially operating the image forming apparatus 100, and a user may be allowed to release a preset auto line select mode or reset a released auto line select mode as necessary.

Meanwhile, the image forming apparatus 100 detects whether a telephone line selected to conduct fax transmission is being used. Then, in the case the selected line is being used, i.e., the line is busy, to transmit or receive another fax, the image forming apparatus 100 informs a user of this situation as shown in FIG. 3 and receives user's selection whether to wait for fax transmission until the selected telephone line is not being used or to use another telephone line among a plurality of telephone lines to conduct the fax transmission.

As shown in FIG. 3, the display 160 displays a standby selection screen 30 to inform a user that the selected telephone line is being used.

A user selects one of buttons 31 on the standby selection screen 30 of the display 160 (e.g., by touching) to select whether to wait for fax transmission until a selected telephone line is not being used or to use another telephone line among a plurality of telephone lines to conduct the fax transmission.

In accordance with user's selection, the image forming apparatus 100 transmits a fax through a different telephone line from a selected telephone line, or waits for fax transmission until the selected telephone line is not being used and then transmits the fax through the selected telephone line when finishing the use of the selected telephone line.

The image forming apparatus 100 may be realized to set up whether to wait for fax transmission illustrated in FIG. 3 when setting up the auto line select mode in FIG. 2, when directing fax transmission, or whenever a selected line is being used by displaying the standby selection screen 30 to receive user's selection.

The display 160 displays the settings and operation state of the image forming apparatus 100 for a user and may display a UI screen to receive various instructions from a user. The display 160 includes a thin film transistor-liquid crystal display (TFT-LCD) and a driver (not shown) to drive the TFT-LCD.

Meanwhile, in the image forming apparatus 100 according to the present invention, as the user operating part 150 is provided as an icon on the display 160 to be selected by a user by touching or the like, the user operating part 150 and the display 160 may not be formed as separate parts but be provided as a single unit.

Also, the display 160 may include a first display provided in the image forming apparatus 100 and a second display provided in a host device (not shown) connected with the image forming apparatus 100 via the communication part 180. In the case the display 160 includes the second display, the UI of the second display as the user operating part 150 is remote user interface (RUI).

The storage part 170 stores a variety of print data for printing, fax data for fax transmission, the communication settings of the respective telephone lines, setting information of the image forming apparatus 100 via the user operating part 150, etc.

Here, the fax data includes at least one of an image data previously stored, an image data scanned by the image reading part 130 for fax transmission, and an image data received from the outside connectable via the communication part 180.

Accordingly, in the storage part 170 are stored information about whether to set up an auto line select mode, whether to select waiting for transmission or using another telephone line when a telephone line is being used, or histories of fax transmission/reception.

Here, the storage part 170 of the image forming apparatus 100 according to the present invention can store information about histories of fax transmission by recipients. Namely, the storage part 170 stores information about the history of communication speeds regarding a specific recipient via the first telephone line 111 and the second telephone line 112. The stored information is obtained from statistical analysis of accumulated communication speeds regarding the specific recipient.

When receiving an instruction of transmitting a fax data which has a size of a reference value or more, the image forming apparatus 100 conducts fax transmission using a telephone line having a relatively faster communication speed with reference to information about the history of a communication speed stored in the storage part 170.

The storage part 170 includes an internal storage device, such as HDD, and an external or portable storage device, such as a USB memory, a memory card (memory stick, CF card, and MMC), and a memory card slot.

The communication part 180 conducts data communication with the external including a host device and a server to receive a print data in a printing language from the external device.

The communication part 180 may include a cable/wireless communication module which can be local- or network-connected with an external device according to a predetermined protocol such as a host device (not shown) or a USB port connectable with a portable storage device such as a USB memory.

The image forming apparatus 100 receives an image data from the external device via the communication part 180 and faxes it through the first faxing part 121 or the second faxing part 122. The image data received from the outside via the communication part 180 is stored in the storage part 170.

Also, the communication part 180 carries out scan-to-host and scan-to-server functions which transmit a scanned data to an external device, such as a host device and a server, according to a predetermined protocol, or sends it to an external device via email (scan-to-email).

The controller 190 controls the image forming apparatus 100 overall. In detail, the controller 190 detects the size of a fax data for fax transmission when receiving an instruction of sending a fax in the auto line select mode.

In the case the fax data has a size of a predetermined reference value or more, the controller 190 checks the communication settings of the first telephone line 111 and the second telephone line 112 and detects whether they are being used. According to the result, the controller 190 controls the faxing part 120 to transmit a fax via one of the first telephone line 111 and the second telephone line 112.

Here, the controller 190 inspects the communication settings of the first telephone line 111 and the second telephone line 112 using information about the first faxing part 121 and the second faxing part 122 matching the first telephone line 111 and the second telephone line 112, respectively, such as the setup values of communication speeds, whether the error correction mode is applied to the faxing parts, and the history of a communication speed as for a specific recipient.

Accordingly, under the state that the second telephone line 112 is set up to have a priority in fax transmission, in the case the first telephone line 111 is set up to have a higher communication speed than the second telephone line 112, the controller 190 can determines that the first telephone line 111 has a priority in fax transmission regardless of the preset priority.

Further, the controller 190 detects whether the first telephone line 111 and the second telephone line 112 are being used and controls the faxing part 120 to transmit a fax data via one selected from the first telephone line 111 and the second telephone line 112 using the communication settings and the detected use information.

Here, the controller 190 determines whether the first telephone line 111 having a priority in fax transmission is in use, i.e., in a busy state, and informs a user that the first telephone line 111 is being used through the display 160 if it is.

A user can select whether to wait for fax transmission until the selected first telephone line 111 is available or to use the second telephone line 112 using the standby selection screen 30 displayed on the display 160. Here, if changing to another telephone line, a user is allowed to change to a telephone line until the use of the first telephone line 111 is finished.

In the case a user decides to change to a telephone line, the controller 190 controls the second faxing part 122 to fax using the second telephone line 112.

Here, if the second telephone line 112 is on standby or ready for being available, the controller 190 controls the second faxing part 122 to fax using the second telephone line 112.

Further, if the second telephone line 112 is also in use, the controller 190 displays the standby selection screen 30 of FIG. 3 on the display 160 to receive user's selection again.

If determining that both the first telephone line 111 and the second telephone line 112 are being used, the controller 190 can be on standby whether to fax through one of the telephone lines which is finished in use first or through a telephone line with a better communication setting among the first telephone line 111 and the second telephone line 112.

Also, in the case the first telephone line 111 set to have a priority in fax transmission is in use, if a user selects a fax transmission standby in FIG. 3, the controller 190 controls the first faxing part 121 to conduct fax transmission when the first telephone line 111 is available.

The controller 190 displays a telephone line selected to transmit a fax according to communication settings and use information on the display 160, and the telephone line displayed on the display 160 may be changed by a user to another telephone line among a plurality of telephone lines through a process illustrated in FIG. 3.

The controller 190 controls the display 160 to display a telephone line finally selected to transmit a fax using the communication settings and use information of the first telephone line 111 and the second telephone line 112.

Further, if a fax data has a size smaller than a predetermine reference value, the controller 190 controls the second faxing part 122 to transmit the fax through the second telephone line 112 set up to have a priority without checking out the communication settings.

Here, the image forming apparatus 100 according to the present invention sets up a reference value of about 50 KB, which is the size of a general text fax data. In general, a text image does not have a big size, and thus communication times according to communication settings may not be substantially different.

Meanwhile, the image forming apparatus 100 of the present invention is realized to transmit a fax using the communication settings and use information of the respective telephone lines only when the fax data has a size of a reference value or more in order to improve its efficiency according to difference between communication speeds. However, as necessary, the image forming apparatus 100 may be realized to use the communication settings and use information of the respective telephone lines regardless of the size of a fax data in all fax transmission. In the present invention, communication settings may include whether a telephone line is in use if necessary.

Also, in the case the image forming apparatus 100 has a multi-line faxing function with three or more lines, it is realized to detect the communication settings of a plurality of lines, respectively, and to transmit a fax using lines in order of better communication settings.

Hereinafter, a process of controlling the image forming apparatus 100 with the foregoing configuration will be described with reference to FIGS. 4 and 5.

Figure 4:
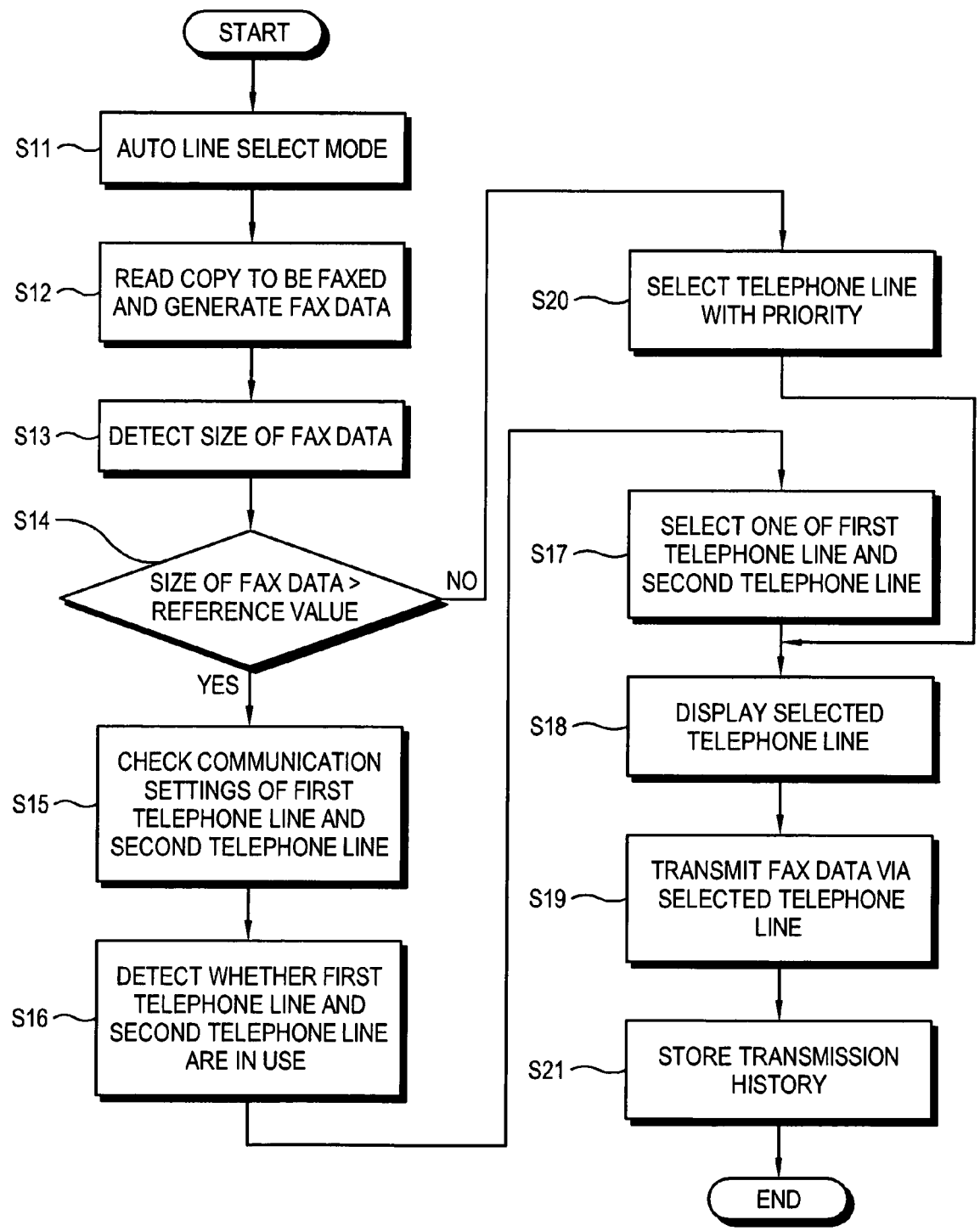
FIGS. 4 and 5 are a flow chart to illustrate a method of controlling the image forming apparatus according to one exemplary embodiment.
Figure 5:
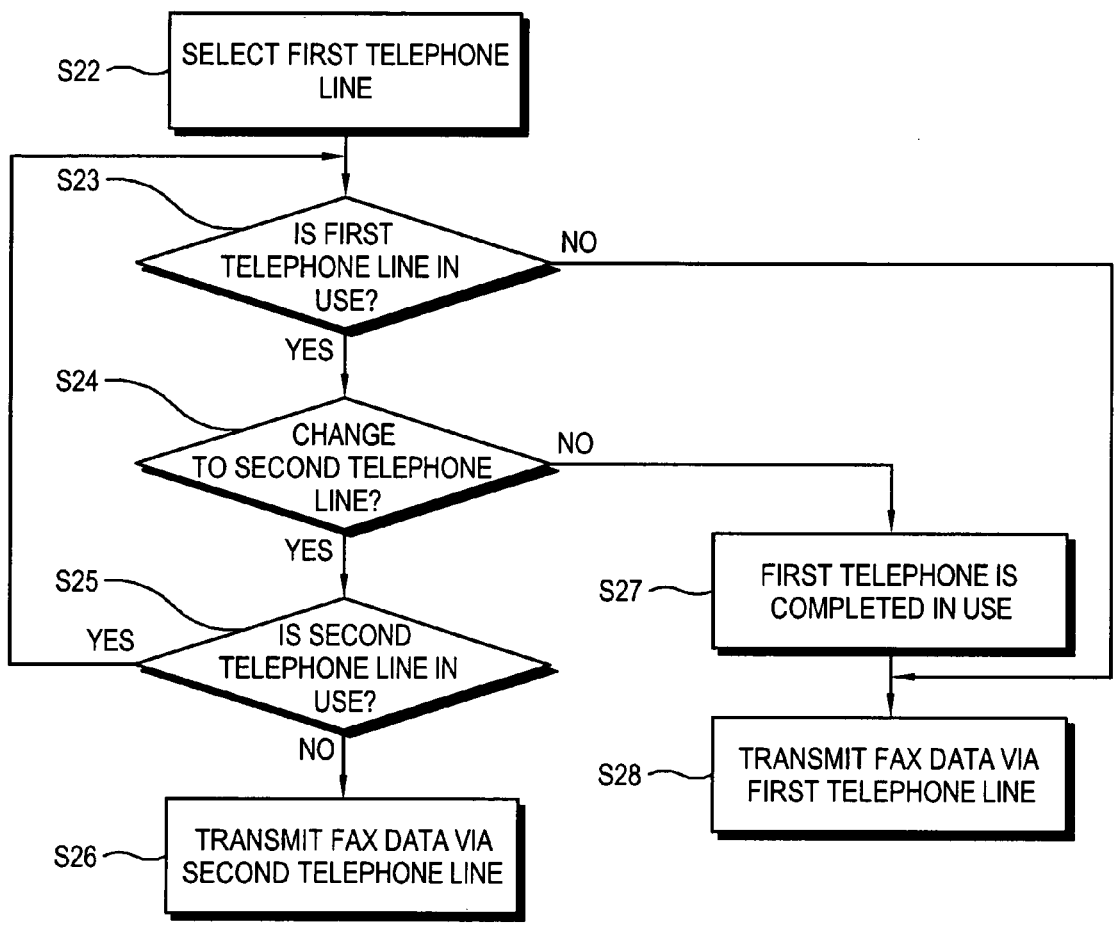

The image forming apparatus 100 according to the exemplary embodiment in FIGS. 4 and 5 is illustrated with the first telephone line 111 and the second telephone line 112 matching the first faxing part 121 and the second faxing part 122, respectively, and the second telephone line 112 being set up to have a priority over the first telephone line 111 in fax transmission.

As illustrated in FIG. 4, the image forming apparatus 100 selects an auto line select mode through the user operating part 150 (S11). Here, the controller 190 displays a mode selection screen 20 shown in FIG. 2 on the display 160 so that a user selects the auto line select mode using a selection button 21 by touching. When the auto line select mode is set to a default when manufacturing the image forming apparatus 100, the operation S11 may be omitted.

In the case of receiving a fax transmission instruction from a user, the controller 190 controls the image reading part 130 to read out a copy to be faxed and to generate a fax data (S12). Here, the operation S12 includes a process of loading an image data to be faxed, which is generated in the image reading part 130, previously stored in the storage part 170, or received from the outside. If a fax data is an image data previously stored in the storage part 170 or received from the outside via the communication part 180, the operation S12 may be omitted.

The controller 190 detects the size of the fax data read out at S12 (S13).

The controller 190 determines whether the size of the fax data detected at S13 is a predetermined reference value or more (S14). Here, the reference value may be set to 50 KB, which is the size of a general text image, and be changed by a user.

According to the result at S14, if the fax data has a size of a predetermined value or more, the controller 190 checks out the communication settings of the first telephone line 111 and the second telephone line 121 (S15). Here, the controller 190 may check out the communication settings using at least one of the setup values of the communication speeds of the first telephone line 111 and the second telephone line 121, whether an error correction mode is applied, and information about the history of communication speeds of the first telephone line 111 and the second telephone line 121 regarding a specific recipient, which is accumulated at S25, mentioned later.

Then, the controller 190 detects whether the first telephone line 111 and the second telephone line 121 are being used (S16).

As a result of the decision at S15 and S16, the controller 190 selects one of the first telephone line 111 and the second telephone line 112 (S17).

The controller 190 displays the result at S17 on the display 160 (S18).

Subsequently, the controller 190 controls the faxing part 120 to transmit the fax data using the telephone line selected at S17 (S19).

Meanwhile, if the fax data has a size less than the reference value at S14, the controller 190 selects the second telephone line 120, which is set to have a priority, for fax transmission without checking the communication settings (S20).

When the fax transmission is completed at S19, the controller 190 stores information about a history, such as information about telephone lines used in fax transmission by recipients and about communication speeds (S21).

Here, in the operations S16 to S18, the telephone line selected at S17 may be changed by a user changing depending on the communication settings of the first telephone line 111 and the second telephone line 112 and whether they are in use.

FIG. 5 is a flow chart illustrating a process of changing a telephone line by the selection of a user in detail with reference to FIG. 4.

At S15 in FIG. 4, in the case the first telephone line 111 has a superior communication setting to the second telephone line 112, the controller 190 may select the first telephone line 111 as a prior telephone line in fax transmission regardless of the predetermined priority order of a plurality of telephone lines (S22). Here, in the case the second telephone line 112 has a superior communication setting to the first telephone line 111, the controller 190 may select the second telephone line 112 as a prior telephone line in fax transmission regardless of the predetermine priority order of a plurality of telephone lines.

The controller 190 detects and determines whether the telephone line selected at S22 is in use, i.e., in the busy state (S23).

If the selected telephone line is determined to be in use at S23, the controller 190 controls the display 160 to inform a user of this and receives user's selection whether to change to the second telephone line 112 or to be standby in fax transmission until the first telephone line 111, being used, is available (S24). Here, the controller 190 displays the standby selection screen 30 of FIG. 3 to receive a display and whether to be standby from a user. Further, whether to be standby in fax transmission may be set up in advance when selecting the auto line select mode at S11 or when receiving a faxing instruction at S12 and be determined and carried out by the predetermined setup.

At S24, if selecting the change of the telephone line, the controller 190 determines whether another telephone line, i.e., the second telephone line 112, among a plurality of telephone lines is in use (S25).

At S23, if the second telephone line 112 is available, i.e., in the ready state, the controller 190 controls the second faxing part 122 to select the second telephone line 112 and to transmit the fax data (S26).

At S25, if the second telephone line 112 is in use, i.e., in the busy state, the controller 190 determines that both the first telephone line 111 and the second telephone line 112 are in use and then retries to detect whether the first telephone line 111 and the second telephone line 112 are in use. Here, in the case both the first telephone line 111 and the second telephone line 112 are in use, the controller 190 conducts fax transmission using a line which is completed first in use, the first telephone line 111 having a favorable communication setting when it is done in use, or the second telephone line 112 with a priority when it is done in use.

At S 24, if not changing the telephone line but selecting to be standby, the controller 190 checks whether the first telephone line 111 is completed in use (S27):

Then, the controller 190 controls the first faxing part 121 to select the first telephone line 111 and to transmit the fax data (S28).

According to the present invention, the image forming apparatus 100 with a multi-line faxing function, in particular, a dual-line faxing function, automatically selects a telephone line with a favorable communication setting among a plurality of telephone lines in fax transmission if a fax data has a size of a reference value or more, thereby reducing time involved in fax transmission and waste of communication charges. Also, the present invention provides a user with convenience since the user may choose to use another telephone line or to be standby in fax transmission when an automatically selected telephone line is in use.

As described above, an image forming apparatus with a multi-line faxing function and a method of controlling a fax thereof according to the present invention is capable of transmitting a fax by automatically selecting a telephone line with a favorable communication setting among a plurality of telephone lines if the fax data has a size of a reference value or more, thereby reducing time involved in fax transmission and waste of communication charges.

Also, the image forming apparatus allows a user to conduct fax transmission using another telephone line or to select a standby mode if an automatically selected telephone line is in use.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of controlling a fax of an image forming apparatus which transmits/receives a fax using a first telephone line and a second telephone line, the method comprising:
    detecting a size of an image data to be transmitted by fax transmission;
    checking communication settings of the first telephone line and the second telephone line if the image data has a size of a predetermined reference value or more, the second telephone line being set to have a priority order in fax transmission;
    detecting whether the first telephone line and the second telephone line are in use; and
    selecting the first telephone line to transmit the image data according to checking result of the communication settings of the first telephone line and second telephone line.

2. The method according to claim 1, further comprising displaying the selected telephone line.

3. The method according to claim 2, wherein the displayed telephone line is changeable to another telephone line by a user.

4. The method according to claim 3, wherein if the selected telephone line is in use, the telephone line is changeable before the telephone line is completed in use.

5. The method according to claim 1, further comprising selecting the second telephone line to transmit the image data without checking the communication settings if the size of the image data is less than a predetermined value.

6. The method according to claim 5, wherein the predetermined value is changeable by a user or an administrator.

7. The method according to claim 1, wherein the communication settings comprises at least one of communication speeds of the respective telephone lines, whether an error correction mode is applied, and information about history of the communication speeds of the respective telephone lines.

8. The method according to claim 1, wherein the image data comprises at least one of an image data previously stored in the image forming apparatus, an image data scanned for fax transmission, and an image data received from an external device connectable to the image forming apparatus.

9. A method of controlling a fax of an image forming apparatus which comprises a first telephone line and a second telephone line, the method comprising:
    setting up an auto line select mode in the image forming apparatus;
    loading an image data to be faxed;
    detecting communication settings of the first telephone line and the second telephone line to transmit the image data to be faxed according to the auto line select mode; and
    transmitting the image data to be faxed by the first telephone lines according to the detected communication settings, the second telephone line being set to have a priority order in fax transmission, wherein the auto line select mode is applied in the case the image data has a size which is a predetermined value or more.

10. An image forming apparatus which transmits a copy to be faxed using a plurality of telephone lines, the image forming apparatus comprising:
   an image reading part to read out the copy to be faxed and generate an image data;
   a storage part to store the image data for fax transmission and communication settings of the respective telephone lines;
   a display to display an auto line select mode to be touchable for transmission of the image data;
   a user operating part to receive an instruction of a user via touching the display or an input button;
   a faxing part to transmit the image data, the faxing part comprising a first faxing part corresponding to a first telephone line and a second faxing part corresponding to a second telephone line, the second telephone line being set to have a priority order in fax transmission; and
   a controller to control the fax part to transmit the image data by selecting the first faxing part using the communication settings according to the auto line select mode,
   wherein the auto line select mode is applied in the case the image data has a size which is a predetermined value or more.

11. The image forming apparatus according to claim 10, wherein the controller controls the faxing part to transmit the fax data by selecting one of the first telephone line and the second telephone line using whether the first telephone line and the second telephone line are in use.

12. The image forming apparatus according to claim 11, wherein the display displays the selected telephone line.

13. The image forming apparatus according to claim 12, wherein the display comprises a first display provided in the image forming apparatus or a second display provided in a host device connected to the image forming apparatus.

14. The image forming apparatus according to claim 12, wherein the displayed telephone line is changeable to another telephone line among the plurality of telephone lines by a user.

15. The image forming apparatus according to claim 14, wherein if the selected telephone line is in use, the telephone line is changeable before use of the telephone line is completed.

16. The image forming apparatus according to claim 11, wherein the communication settings comprises at least one of communication speeds of the respective telephone lines, whether an error correction mode is applied, and information about history of the communication speeds of the respective telephone lines.

17. The image forming apparatus according to claim 10, further comprising a communication part connectable with an external device,
   wherein the image data comprises at least one of an image data previously stored in the storage part, an image data generated in the image reading part, and an image data received from the external device connectable via the communication part.

18. The method according to claim 1, further comprising:
   waiting for fax transmission if the first telephone line is in use; and
   transmitting the image data by the first telephone line when the first telephone line is available.

19. The method according to claim 9, further comprising:
   waiting for fax transmission if the first telephone line is in use; and
   transmitting the image data by the first telephone line when the first telephone line is available.

20. The image forming apparatus according to claim 10, wherein the controller controls the fax part to wait for fax transmission if the first telephone line is in use and transmits the image data by the first telephone line when the first telephone line is available.

* * * * *

UNITED STATES PATENT AND TRADEMARK OFFICE
CERTIFICATE OF CORRECTION

PATENT NO. : 8,467,511 B2
APPLICATION NO. : 12/659529
DATED : June 18, 2013
INVENTOR(S) : Dae-gon Eun Page 1 of 1

It is certified that error appears in the above-identified patent and that said Letters Patent is hereby corrected as shown below:

In the Claims

Column 12, Line 65, In Claim 9, delete "lines" and insert -- line --, therefor.

Signed and Sealed this
Eighth Day of October, 2013

Teresa Stanek Rea
*Deputy Director of the United States Patent and Trademark Office*